United States Patent

Taudt et al.

[15] 3,657,472

[45] Apr. 18, 1972

[54] METHOD AND APPARATUS FOR THE DOT-BY-DOT AND LINE-BY-LINE RASTERED RECORDING OF PICTURE SIGNALS OBTAINED BY SCANNING PICTURE ORIGINALS WITH A RASTER ROTATED WITH RESPECT TO THE RECORDING DIRECTION

[72] Inventors: Heinz Taudt, Kiel; Hans Keller, Kiel-Wik, both of Germany

[73] Assignee: Dr.-Ing. Rudolf Hell

[22] Filed: Jan. 9, 1970

[21] Appl. No.: 1,614

[30] Foreign Application Priority Data

Jan. 10, 1969 Germany ....................P 19 01 101.9

[52] U.S. Cl. .......................178/6.7 R, 178/5.2 A, 178/6.6 B
[51] Int. Cl. ....................H04n 1/06, H04n 1/46, H04n 5/84
[58] Field of Search .........................178/6.6 B, 6.7 R, 5.2 A

[56] References Cited

UNITED STATES PATENTS

| | | | |
|---|---|---|---|
| 3,436,472 | 4/1969 | Kyte | 178/6.7 R |
| 1,751,584 | 3/1930 | Hansell | 178/DIG. 2 |
| 2,695,924 | 11/1954 | Ballard | 178/6.6 B |
| 1,849,544 | 3/1932 | Howey | 178/6.6 B |
| 3,465,199 | 9/1969 | Simshauser | 178/6.6 B |
| 2,863,000 | 12/1958 | Hell | 178/6.6 B |

*Primary Examiner*—Howard W. Britton
*Attorney*—Hill, Sherman, Meroni, Gross & Simpson

[57] ABSTRACT

A method of recording dot-by-dot and line-by-line in a predetermined raster structure, picture signals obtained by scanning picture originals, with a raster rotated with respect to the recording direction, the picture signals and the raster signals being superimposed, and repetition, raster being recorded in a finer resolution than the picture content, in which a raster angle of rotation having a rational tangent is employed, produce raster signals which correspond to the structural content of an area, taken from the selected rotated raster, the boundary lines of which lie in the recording and the feed directions respectively, and which contain the fundamental period of the rotated raster structure in each of such directions, i.e., that part of the raster structure extending in the direction involved lying between two raster repetitions, but which does not in itself contain a predetition, with such raster signals being periodically repeated at a frequency adequate for the picture formation. Two forms of apparatus are disclosed for practicing the method, one of which utilizes a simultaneous recording of a plurality of partial lines extending in the recording direction and forming one picture line, and the other of which utilizes a successive recording of partial lines extending transversely to the recording direction and forming one picture line.

21 Claims, 6 Drawing Figures

Patented April 18, 1972 3,657,472

5 Sheets-Sheet 1

INVENTOR.
Heinz Taudt
Hans Keller

BY Hill, Sherman, Meroni, Gross & Simpson
ATTORNEYS

INVENTOR.
Heinz Taudt
Hans Keller

BY Hill, Sherman, Meroni, Gross & Simpson
ATTORNEYS

INVENTOR.
Heinz Taudt
Hans Keller

BY Hill, Sherman, Meroni, Gross & Simpson
ATTORNEYS

INVENTOR
Heinz Taudt
Hans Keller

BY Hill, Sherman, Meroni, Gross & Simpson
ATTORNEYS

INVENTOR
Heinz Taudt
Hans Keller

BY Hill, Sherman, Meroni, Gross & Simpson
ATTORNEYS

METHOD AND APPARATUS FOR THE DOT-BY-DOT AND LINE-BY-LINE RASTERED RECORDING OF PICTURE SIGNALS OBTAINED BY SCANNING PICTURE ORIGINALS WITH A RASTER ROTATED WITH RESPECT TO THE RECORDING DIRECTION

BACKGROUND OF THE INVENTION

The present invention is directed to a method and apparatus for recording dot-by-dot and line-by-line in a predetermined raster structure, picture signals obtained by scanning picture originals, with a raster rotated with respect to the recording direction, and the picture signals and the raster signals being superimposed with the raster being recorded in a finer resolution than the picture content, preferably in connection with the production of cross-rastered corrected color separation recordings with rotational scanning.

As is well known, to avoid the formation of a moire pattern, the raster structure of the respective color separations necessary for the rastered reproduction of a multi-color picture must be rotated relative to each other by a sufficiently large angle (customarily about 30°).

Where flat-bed electrotype machines are involved, such angling of the raster presents little problem as it can be achieved in a very simple manner by effecting a relative rotation, between the picture original and the recording support, by the particular raster angle of rotation with respect to the recording direction, while the recording member such as an engraving needle, recording lamp or the like, by means of the raster signals superimposed on the picture signals, records at all times the raster in unrotated relation with respect to the direction of the relative motion between the table and the recording member.

However, it also becomes desirable to produce such rastered colored separations on drum scanners, and in particular to simultaneously produce all of the color separations of the picture original, whereby a saving in time is achieved which may often be of very great importance.

In this arrangement an oblique setting of the picture copy and of the support for the recording medium on the respective drums, for example of a drum scanner presents a number of difficulties and objections.

Thus, when the picture original is clamped in operative position, as a result of the clamping forces and in particular bending forces, the original undergoes certain distortions which, in addition, are not consistent with repeated clampings. Further, such distortions occur upon various oblique positions in a different orientation, so that the various color separations of a picture would not turn out as being precisely equal in congruence as is imperative for clean super-imposition printing. Consequently, only one color separation can normally be produced at one time. Finally, in the utilization of an oblique position, on the order of magnitude of 45°, which unavoidably happens in the case of three-color separations, the utilization of the drum generated surface is far too poor.

Where drum electrotype machines are involved, by suitable displacements of the raster points from line to line and by suitable selection of their intervals, different preferred directions of the raster pattern have been obtained, as an expedient, said directions corresponding to the various raster angles of rotation. However, these rasters, which only simulate a raster rotation, result in the production of a certain fine moire pattern in the finished reproduction.

It also heretofore has been proposed to scan, simultaneously with the scanning of the picture original, a graphic raster original, namely a vignetted contact raster and to superimpose on the picture signal the raster signals obtained in this manner. In this connection, inasmuch as a controllable recording light source serves as a recording member the raster dot size which is actually recorded and which corresponds to the local picture brightness is determined in cooperation with the sensitivity threshold of the photo material serving as the recording medium, or with the utilization of a special electronic threshold valve circuit.

Such raster copy can, without too much difficulty, be clamped in the necessary oblique or inclined position. However, this arrangement possesses the disadvantage that a further scanning head or a longer or an additional drum is also needed, which thus leads to a correspondingly greater length in the machine involved.

Likewise, if under these conditions several color separations are to be recorded simultaneously, the additional technical requirements, a raster original drum for each color separation or a correspondingly greater drum lengths, together with a scanning head, etc., are so great as to be scarcely justifiable.

The present invention presents a method and apparatus for practicing such method which enables the avoidance of a scanning of a graphic raster original synchronously with the recording, and instead thereof, generating the raster signal electronically during the recording.

SUMMARY OF THE INVENTION

In the practice of the method of the invention a raster angle of rotation is employed having a rational tangent, with the raster signals being generated in correspondence to the structural content of an area or detail taken from the selected rotated raster, the boundary lines of which area respectively lie in the recording and feed directions and which contain the fundamental period of the structure in each of such directions, i.e., that part of the raster structure extending in the direction involved lying between two raster repetitions, but which does not in itself contain a repetition.

It is customary and advantageous to select a raster dot size in correspondence to an average gray value in such a way that the raster dot width agrees approximately with the picture line width. However, if the contours of the raster dot are to be reproduced in even a more detailed fashion, the raster must be recorded with a finer resolution than the picture content, which in broad concept is already utilized with known apparatus in which the recording of each raster dot is composed individually of several partial lines, but which does not involve the rotation of the raster structure.

Advantageously, the raster detail or area involved may accordingly be resolved into a selected number of partial lines extending in the picture recording direction whereby a plurality of such partial lines make up the width of a single picture line.

In accordance with a further feature of the invention, the partial lines disposed within the same picture line may be simultaneously recorded. This can, for example, be effected in a particularly advantageous manner by utilizing separately controllable recording members, such as a recording lamp or the like, for recording each of the partial lines falling within the same picture line, and making all of these recording members simultaneously responsive to the same picture signal. Another efficient method of recording involves the resolving of the raster detail or area into partial lines which extend transversely to the picture recording direction and of which the portions lying within the same picture line are always recorded successively. In this case, expediently the recording source of light may be in the form of a cathode ray tube, the electron beam of which is periodically deflected transversely to the picture recording direction at a rate which is rapid in comparison with the picture recording speed, with the brightness of the beam being under the partial control of the raster signals associated with the respective partial line portions.

The present disclosure illustrates two forms of the basic method involved and two apparatus embodiments for obtaining and generating the raster signals involved.

In one form of this method, the raster signals of the raster area or detail, are obtained, prior to commencement of the recording, by scanning a vignetted graphic raster pattern with the scanning results being read into a store and the store content being read out in periodic repetition, picture line by picture line, at the time of recording of the picture, with such raster signals being superimposed on the picture signals.

In accordance with the second form of the method, it is not necessary to obtain the raster signals from a raster pattern. Instead, the raster signals corresponding to the information content of a partial line, at the instant of the recording, are generated by super imposition of periodic alternating voltages of suitable frequency and wave shape, which alternating voltages are shifted in phase by suitable amounts in accordance with the information content varying from partial line to partial line. Where the recording of several color separations are involved, pertaining to the same picture, with rasters rotated by different angles, in order, on the one hand to avoid any moire pattern formations, and on the other hand to keep the necessary cost of electronic means as low as possible, rasters having different fundamental periods can be selected for the different color separations, whereby the greatest fundamental period is an integral multiple of each of the smaller fundamental periods involved.

Likewise, raster networks having a different raster definition may be employed to achieve desired relationships between the fundamental periods.

BRIEF DESCRIPTION OF THE DRAWINGS

Referring to the drawings wherein like character references indicate like or corresponding parts.

DETAILED DESCRIPTION OF THE INVENTION

Figure 1:
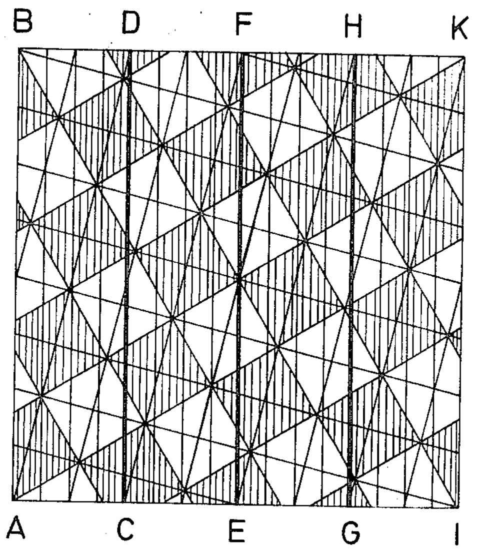
FIG. 1 represents a small area or detail of a vignetted raster rotated through ≈ 14.04° with respect to the recording direction, highly enlarged to show details thereof.

Referring to the drawings and more particularly to FIG. 1, there is illustrated therein a square raster area or detail forming a part of the raster structure employed in the recording operation in which the raster angle, i.e., the angle of the raster orientation with respect to the recording direction, amounts to ≈ 14.04° whereby the angle has a rational tangent, in this case, 1:4. In such square raster area, the boundary lines of which lie in the recording and in the feed directions, such boundary lines represent a fundamental period of the structure of the rotated raster with respect to each of such two direction, i.e., that part of the raster structure extending in the direction involved, lying between two raster repetitions, but which does not itself contain a repetition.

In connection with the generation of raster signals for the recording of such rasters, it should be kept in mind that there is involved a vignetted raster, i.e., one in which the density value of each raster field or interstice changes steadily from the center to the edge. In this connection, one can proceed from the assumption that such fields of the raster area, such as illustrated in FIG. 1, represent density pyramids, for example, the light fields of FIG. 1 representing raised pyramids, i.e., elevated upwardly with respect to the plane of the drawings, and the dark fields represent pyramidal depressions, i.e., depressed with respect to the plane of the drawings, relative to an average level.

Figure 2:
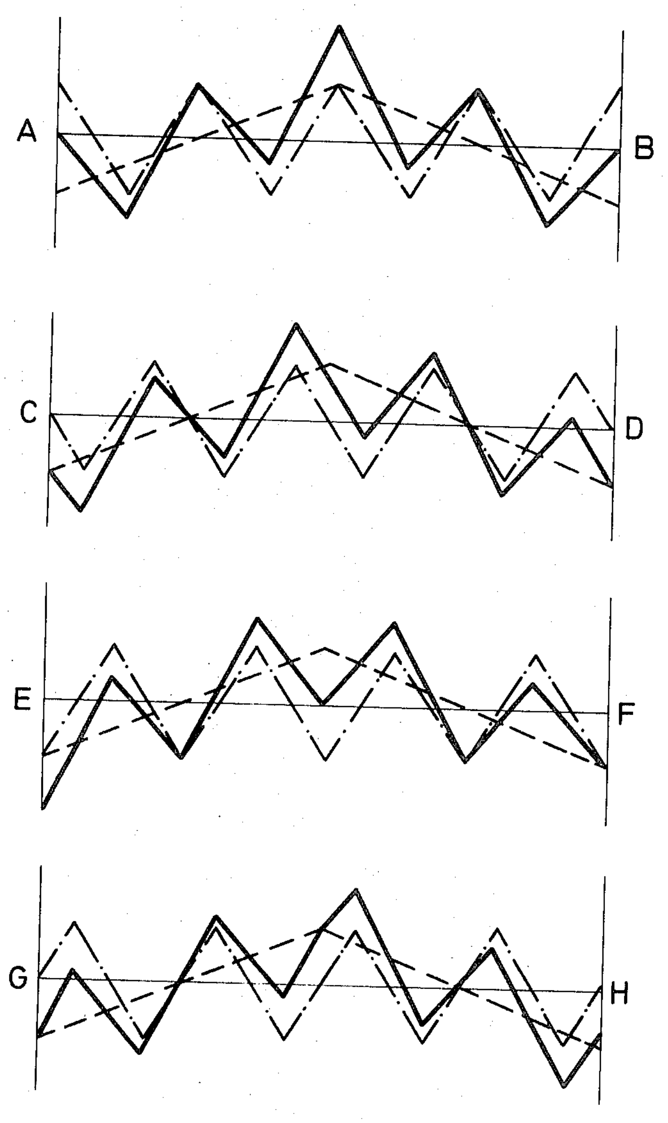
FIG. 2 represents wave forms of raster signal voltages utilizable for the recording of the raster area illustrated in FIG. 1.

Consequently, the wave form of the raster signal voltages may be defined by a section through the "density area" in the direction selected for the recording of the raster signal. Thus, referring to FIG. 1, the area or detail illustrated is sub-divided by the lines C–D, E–F and G–H, into four strips, each of which corresponds to a picture line, and each picture line in turn is resolved into four partial strips, which represent the aforementioned partial lines. Curves, defined by solid lines, are illustrated in FIG. 2 for the lines A–B, C–D, E–F, and G–H of FIG. 1. The curve for the line J–K is not illustrated as that would be identical to that of the line A–B.

Also depicted in FIG. 2 for each line are two additional wave forms, illustrated in broken or dot-dash lines which represent two periodic triangular or saw-tooth alternating voltages having a constant frequency and amplitude which, upon additive superimposition, will produce a voltage corresponding to the voltages illustrated in solid lines. In other words, representing what may be considered a synthetic reproduction of the original voltage form. As will be apparent from a reference to FIG. 2, in the example selected, the period of the one alternating voltage is equal to the raster period, while the period of the other alternating voltage is a quarter of the raster period.

As will also be noted from FIG. 2, the wave form of the voltages varying from partial line to partial line of the raster signal can be readily produced in a simple manner by merely effecting a suitable phase shift between the two saw tooth alternating voltages. Thus, within a single picture line width there is a phase shift of the slower alternating voltage by 360° and a phase shift of the faster alternating voltage of 90°, respectively related to their own period, with the two-phase shifts, however, extending in mutually opposed senses.

It will be apparent, however, that from partial line to partial line within a single picture line, in which each picture line contains n partial lines, a phase shift for the slower alternating voltage of $360°/n$, and for the faster alternating voltage a phase shift of $90°/n$. Thus in the example illustrated, for the slower voltage, a phase shift of $360°/4 = 90°$, and for the faster alternating voltage a phase shift of $90°/4 = 22.5°$. It will be apparent from the above explanation of the method involved in the invention, in connection with an example employing a raster angle of ≈ 14.03°, the tangent of which amounts to 1:4, that the invention may be readily utilized with other raster angles which have a rational tangent. Thus, for example, with a raster angle of ≈ 18.4°, the tangent of which amounts to 1:3, the periods of the generating voltages will accordingly have to be in the ratio of 1:3, and the phase shift of the faster alternating voltage from picture line to picture line will in each case amount to 120°.

Figure 3:
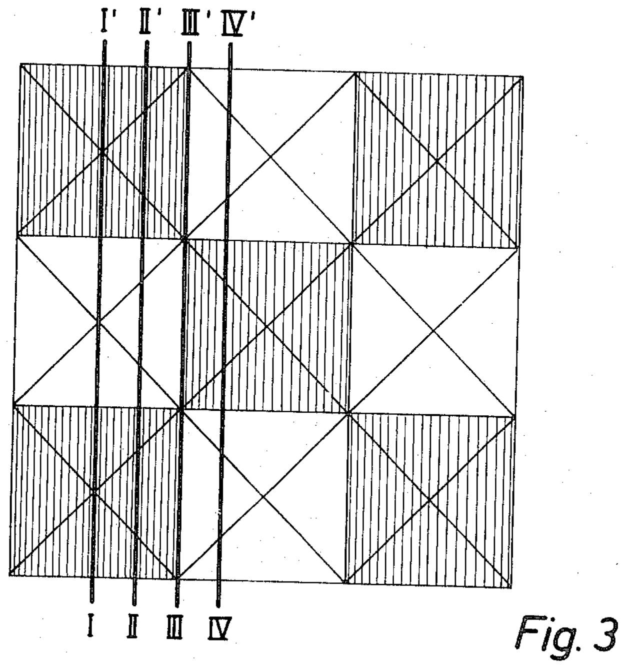
FIG. 3 illustrates a raster rotated through ≈ 45°.

FIG. 3 illustrates the considerably simpler generation of the raster signal in the case of a raster rotated through 45° with respect to the recording direction and, as will be evident from such figure, in this case the fundamental period extends only over two density pyramids, which is equivalent in form to the diagonal of a raster field. Consequently, to effect the recording of such a raster, only a single alternating voltage is required which should make a phase-angle shift of 180° after each half of a fundamental period.

Figure 4:
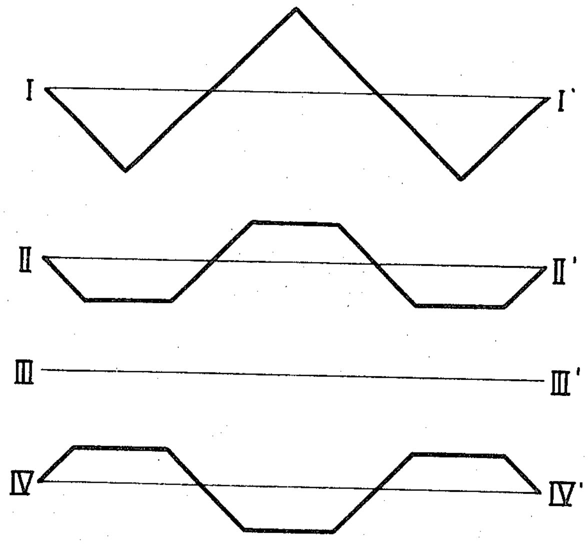
FIG. 4 represents wave forms of signal voltages pertaining to the raster of FIG. 3.

FIG. 4 illustrates the wave form of the alternating voltage which are representative for the three specific section lines I–I', II–II', III–III', and IV–IV'. In this illustration, the section line I–I' extends exactly through the apices of the density pyramids and the resulting curve consequently is triangular or sawtooth.

As the section line II–II' intersects the pyramid flanks in parallel relation to one side of the pyramid base surface, it produces a trapezoidal wave form. As is well known, a trapezoidal alternating voltage can readily be attained from a triangular or sawtooth alternating voltage by means of the utilization of a clamping circuit.

As the section line III–III' coincides with one side of each of the pyramidal base surfaces, the raster signal voltage along such line assumes a value of zero, and finally the section line IV–IV' also generates a trapezoidal wave form which is, however, displaced by 180° with respect to the trapezoidal curve on the section line II–II'.

In practicing the method of the invention, the features thus far discussed may be utilized with either a simultaneous recording of partial line portions making up a single picture line, for example by simultaneous recording of such partial lines, proceeding in the same direction as that of a picture line, or by successive recording of partial lines making up a single picture line extending transversely to the recording direction. Either procedure may be very effectively produced utilizing a light responsive recording medium in conjunction with recording devices such as suitable light-producing lamps or tubes. Thus, in the case of simultaneous recording of partial lines, individual light sources may be utilized for the recording of each partial line, and in the event a sequential recording of partial lines is effected, this may be readily accomplished by means of a moving source of light which is deflected transversely to the picture recording direction at a rate which is rapid in comparison with the picture recording speed, controlling the brightness of such beam by the raster and scanned picture signals associated with the respective partial line portion.

APPARATUS FOR PRACTICING THE METHOD OF THE INVENTION

Figure 5:
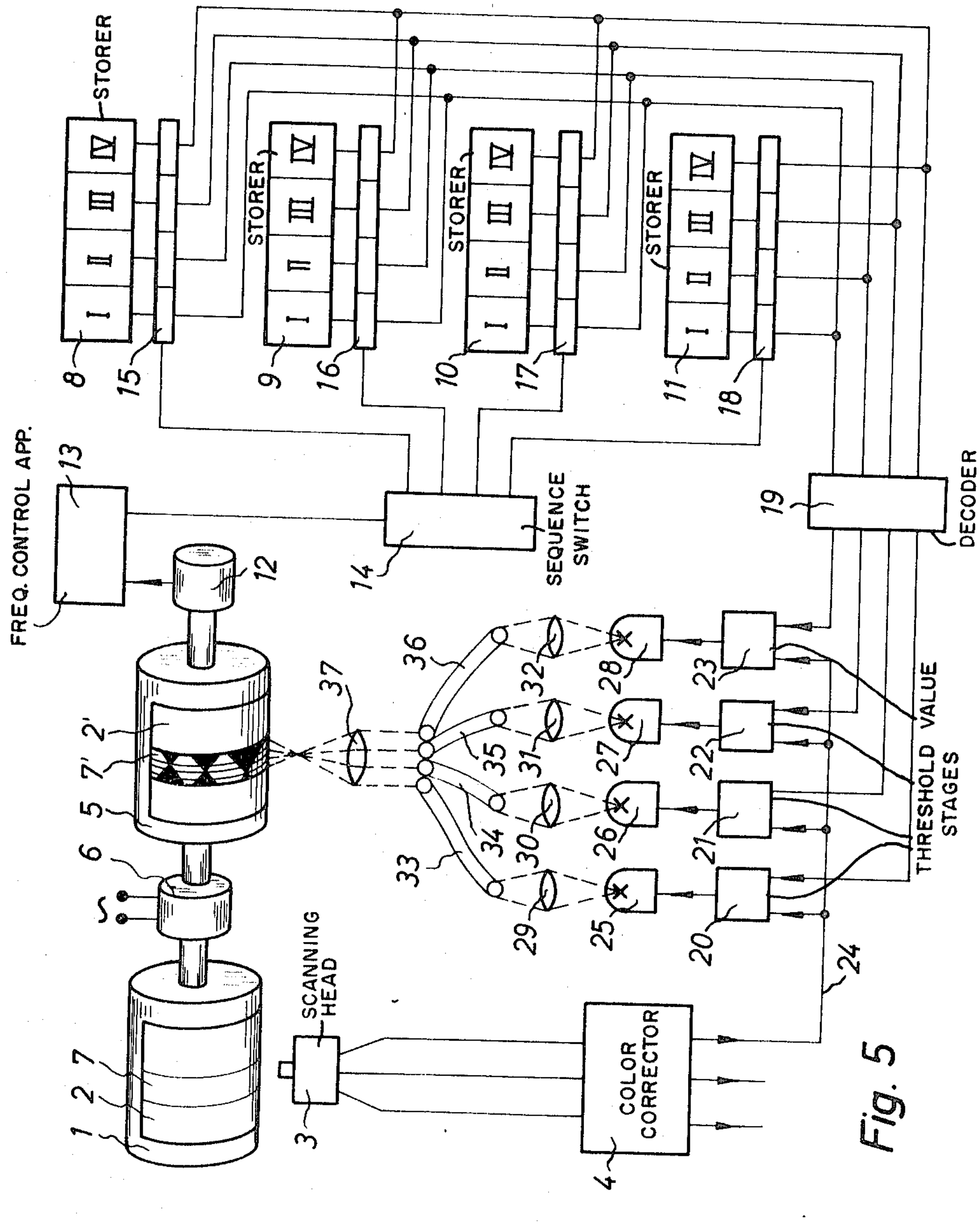
FIG. 5 represents a schematic circuit diagram of an apparatus suitable for carrying out the method of the invention, employing simultaneous recording of corresponding portions of respective partial lines.
Figure 6:
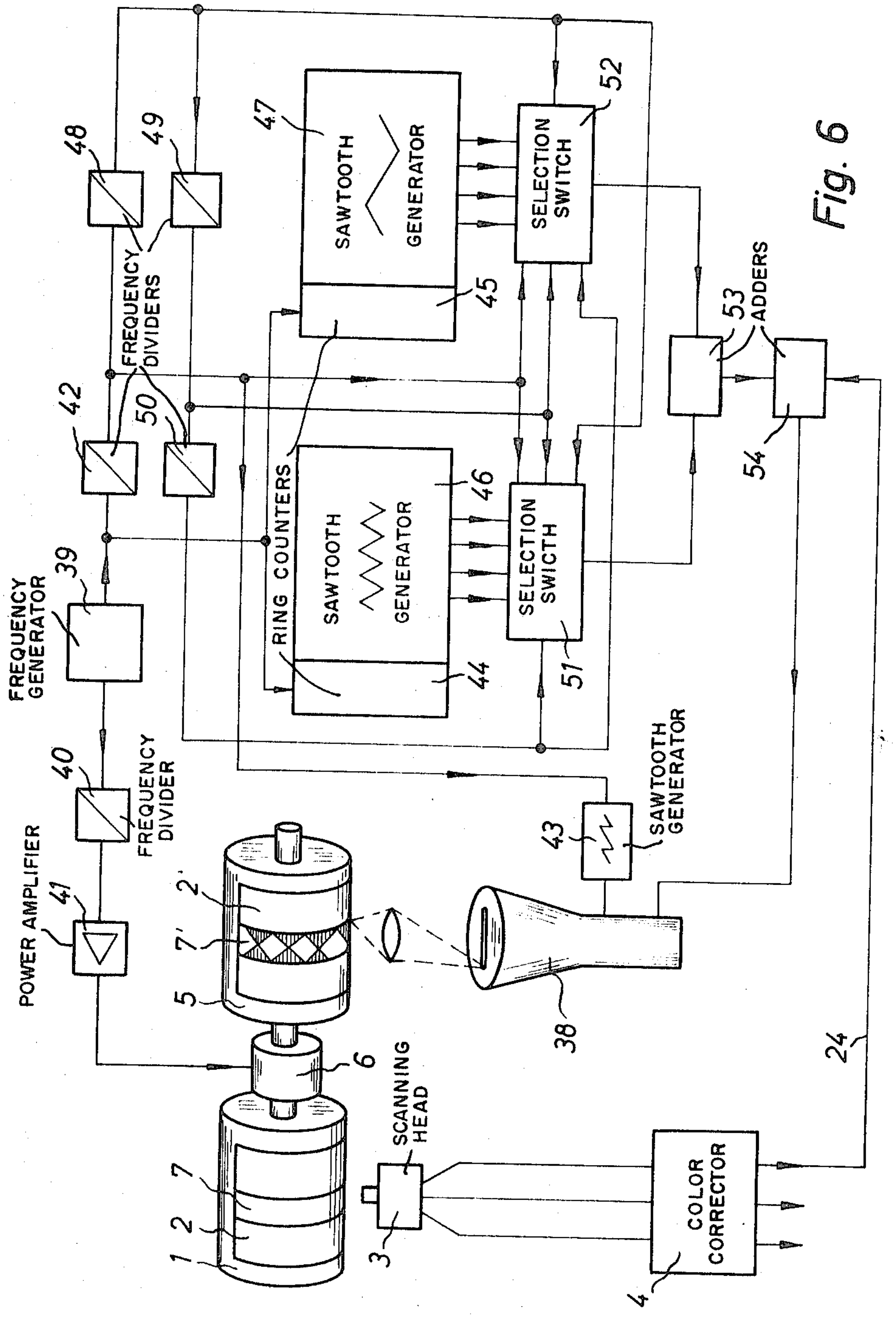
FIG. 6 represents a schematic circuit diagram of an apparatus suitable for carrying out the method of the invention, employing successive recording of respective partial lines.

FIGS. 5 and 6 illustrate respective circuits for the practice of the invention, the circuit of FIG. 5 involving simultaneous recording of partial lines making up a picture line while FIG. 6 illustrates a circuit utilizing successive recording of partial line portion of a single picture line.

Referring to FIG. 5, the reference numeral 1 designates a scanning drum adapted to receive and support a picture original 2 which is adapted to be scanned photoelectrically during rotation of the drum, by means of a scanning head 3. Assuming that the picture original 2 is a colored picture, from which corrected and rastered color separations are to be produced, the scanning head 3 is constructed to produce a trio of color separation signals from each picture point which would be subjected to a color correction in a color computer or corrector 4 arranged to receive the color signals from the head 3.

FIG. 5 illustrates the circuitry and cooperable elements associated with the processing of the signals representative of only a single corrected color separation and it will be apparent that for simultaneous reproduction of the other two colored separation signals respective apparatus illustrated in FIG. 5 for the one separation signal would be duplicated for each of the other two separation signals, the specific components of which, however, would be modified in accordance with the present method to provide desired operational parameters and characteristics.

The scanning drum 1 and the recording drum 5 are illustrated as being driven by a synchronous motor 6. In order to provide a clear representation, picture lines VII–VII′ are illustrated on the picture original 2 and the recording support 2′ respectively with greatly exaggerated width. It will be apparent that each such picture line is resolved on the rastered recording into several partial lines, corresponding to the partial lines illustrated in FIG. 1. While only four partial lines are illustrated as making up a single picture line, in actual practice it will normally be desirable to employ at least twice this number.

Assuming that the fundamental period of the raster involved extends over four picture lines, there are provided four electronic data stores 8, 9, 10 and 11, into which it shall be assumed that the necessary raster information has been entered by a previous scanning of a sample raster and quantization and coding of the raster signals. In the particular embodiment illustrated, each of such data storers comprises four storage cells I, II, III and IV, which thus correspond to the respective four partial lines.

Consequently, in this example, if $\lambda$ equals the phase shift between like sections of successive stores, $\lambda = 360°/N$, where $N$ equals the number of scanning lines in a fundamental period, and the phase shift between successive sections of a store equals $\lambda/N$ wherein $n$ equals the number of partial lines in a picture line.

In order to synchronize the reading out of the raster information with respect to the recording speed, a generator 12 is coupled to the shaft carrying the drums 1 and 5 which generator supplies a timing frequency voltage to control apparatus 13. The latter is operable, in response to impulses derived from the timing frequency, to actuate a four-step electronic sequence switch 14. The latter, in turn, is operable following a cycle corresponding a picture line change, to transmit appropriate reading command signals to output registers 15–18 respectively associated with the storers 8–11.

The respective storers in the embodiment illustrated, are assumed to be constructed to store binary data which is read out under the control of the associated register, with the data so read out being reconverted into appropriate analog values by means of a decoder 19. As will be apparent from a reference to FIG. 5, corresponding sections I, II, III or IV of the respective storers are connected in parallel and following decoding in the decoder 19 are conducted to respective superimposition and threshold value stages 20, 21, 22 and 23, whereby each of the latter is adapted to receive signals associated with a respective partial line making up a single picture line. As the four partial lines belong to the same picture line, the picture signal voltage received from the color computer or corrector 4, over line 24, is supplied in common to the respective stages 2, 21, 22 and 23 and is therein superimposed on the associated respective partial line raster signal. The signal voltage derived as a result of the superimposition is conducted to an electric threshold circuit which insures that each raster point is recorded in a size corresponding to respective level of the picture signal voltage.

Simultaneous recording of all four partial lines may be achieved with four recording lamps 25, 26, 27 and 28 which are respectively connected to the outputs of the superimposition and threshold value stages 20, 21, 22 and 23. As it would present technical difficulties to attempt to reduce the size of the four recording lamps to a single picture line width, larger lamps are employed in the embodiment illustrated in FIG. 5 with the light from each recording lamp being focussed by means of a corresponding lens 29, 30, 31 and 32 on the end of a respective cooperable light conducting fiber bundle, 33, 34, 35 or 36. The external diameters of the respective fiber bundles may be comparatively small at the outlet end and thus the opposite free ends of the respective bundles may be disposed in closely adjacent relation for focusing, by means of a suitable optical system 37 on the recording medium 2′. Thus, the size of the image projected upon the recording medium may be but a fraction of that of the respective recording lamps.

FIG. 6 illustrates a circuit in which it is assumed that the raster detail or area is resolved into partial lines which extend transversely to the picture line direction and of which portions lying within the same picture line are recorded successively. As the raster area or detail comprises the fundamental period both in the recording and feed directions, the raster signal curves illustrated in FIGS. 2 and 4 are also applicable to such transverse recording.

As will be apparent like reference characters are utilized in FIG. 6 to identify like parts appearing in FIG. 5, for example, the scanning and recording drums, actuating motor 6, scanning head 3 and color computer 4.

In this circuit, however, in contrast to the arrangement of FIG. 5, only a single recording light source is employed which is illustrated as being in the form of a cathode ray tube 38, the electron beam of which is periodically deflected transversely to the picture recording direction and rapidly in comparison with the picture recording speed, with the beam brightness being controlled by the raster signals associated with the respective partial line portion and the scanned picture signal.

In this connection, the raster signals are generated by the superimposition of two periodic alternating voltages of suitable frequency and wave form as previously discussed in detail in connection with FIGS. 2 and 4.

To provide proper synchronization of the generated raster signal relative to the recording speed, there is provided a frequency generator 39 from which the frequency of the driving alternating voltage is obtained over a frequency divider 40, the output voltage of which controls a power amplifier 41 feeding the motor 6.

The output of the generator 39, following a reduction in frequency in the frequency divider 42, controls the frequency of a sawtooth generator 43 the output of which is employed to control the transverse deflection of the electron beam of the tube 38. The output of the generator 39 is also utilized to effect synchronized operation of two ring counters 44 and 45 which are respectively associated with sawtooth voltage generators 46 and 47 to control the phase positions of the partial raster voltages appearing at the respective outputs of such generators.

The frequency divider 42 reduces what may be termed the partial point beat or frequency, i.e., the fraction of a partial line, to the partial line frequency while a frequency divider 48 reduces the partial line frequency to the period beat or frequency in the picture line direction. An additional frequency divider 49 derives from the period frequency the beat or frequency corresponding to the commencement of a new picture line, while a frequency divider 50 finally produces the period beat or timing frequency in the feed direction.

The four timing frequencies derived by frequency division are supplied to each of two signal selection switches 51 and 52 which control the respective phase shifted outputs of the voltage generators 46 and 47 and ensure that the respective partial raster voltages are passed in appropriate phase positions.

The partial raster voltages passed by the switches 51 and 52 are additively superimposed one upon the other in a stage 53 to produce the actual raster signal voltages. The superimposition stage 54 corresponds to one of the stages 20–23 of FIG. 5, in which the scanned picture signals and raster signals are superimposed on each other and are fed to a threshold value circuit. The output of the stage 54 is connected to the electrode of the cathode ray tube 38 operative to control the beam brightness thereof.

As in the construction illustrated in FIG. 5, FIG. 6 illustrates, in detail, the circuitry associated with only one color separation voltage and to simultaneously prepare color separations for the other two color separation voltages, the apparatus illustrated in FIG. 6 would be duplicated, where necessary, as for example drum 5, tube 38 and the respective control circuits therefor, of which a single generator 39 and appropriate frequency dividers may be employed in common wherever the frequencies involved permit.

Having thus described our invention, it will be apparent that various immaterial modifications may be made in the same without departing from the spirit of the invention.

We claim as our invention:

1. A method of producing color separations with rotated rasters for the colored reproduction of a picture original, by dot-by-dot and line-by-line recording of picture signals derived from such picture signals derived from such picture original, comprising the steps of effecting a single scanning of the picture original line-by-line in a scanning direction which is non-oblique relative to the picture content thereof, to provide picture signals for each color separation, with the width of the picture lines being defined for each color separation by the size of the dots, producing respective raster signals for each separation, corresponding to raster angles of rotation having a rational tangent, and which respectively represent congruent raster areas having the width of a plurality of dots of the picture original, and having boundary lines lying the in the recording and feed directions defining a fundamental period of the rotated rasters allocated to the respective color separations, i.e., that part of the raster structure in each direction involved lying between two raster repetitions but which does not in itself contain a repetition, dividing such areas into partial lines with a finer resolution than the width of the scanned picture lines, producing the raster signals for each rotated raster in correspondence to the structure of each partial line, superimposing the picture signals on the respective raster signals and so recording each of the superimposed signals with respect to the direction of the partial lines, line-by-line on recording media in a recording direction which is non-oblique relative to the recorded picture content, each of such recordations representing a color separation having a raster structure corresponding to the associated rotated raster extending angularly with respect to said recording direction.

2. A method according to claim 1, comprising in further combination, the steps of producing the raster signals of the raster area by scanning a vignetted graphic pattern raster and storing such signals, and upon the recording of the picture, reading out said signals in periodic repetition, picture line by picture line, for superimposition upon the picture signals.

3. A method according to claim 1, comprising utilizing a raster angle, the tangent of which is smaller than 1, and generating a raster signal corresponding to the information content of a partial line by mutual superimposition of periodic alternating voltages of predetermined frequency and wave form, and shifting such alternating voltages in phase by suitable amounts in accordance with the information content varying from partial line to partial line.

4. A method according to claim 1, comprising resolving the raster structure into partial lines extending transversely to the picture recording direction, and successively recording the portions of such partial lines occurring within the same picture line.

5. A method according to claim 4, comprising recording with a moving source of light, periodically effecting a deflection of said light transversely to the picture recording direction, rapidly in comparison with the picture recording speed and controlling the brightness of such beam by the raster signals associated with the respective partial line portions.

6. A method according to claim 1, for the recording of several color separations pertaining to the same picture, with respective rasters rotated by different angles, comprising recording with respective rasters having different fundamental periods, with the greatest fundamental period being an integral multiple of each of the smaller fundamental periods.

7. A method according to claim 6, wherein the raster networks utilized have different raster definitions.

8. A method according to claim 1 comprising resolving the picture area into a plurality of partial lines extending in the picture recording direction, with a plurality of such partial lines occurring in one picture line.

9. A method according to claim 8, comprising simultaneously recording the partial lines occurring within the same picture line.

10. A method according to claim 8, comprising separately recording each of the partial lines occurring within the same picture line simultaneously, and utilizing the same picture signal for all such partial lines.

11. An apparatus for recording, dot-by-dot and line-by-line in a predetermined raster structure rotated with respect to the recording direction, picture signals obtained by scanning a picture original, comprising first rotatable drum means for supporting a picture original, second rotatable drum means for supporting a recording media upon which the reproduction is to be produced, scanning means arranged to scan an original supported on said first drum means, recording means arranged for cooperation with said second drum means for effecting a recording on a recording medium supported thereon, means for rotating said first and second drum means in synchronism, means for producing raster signals, synchronized with rotation of said first and second drum means, which correspond to the structural content of an area taken from the raster structure, rotated through an angle having a rational tangent, the boundary lines of which area extend for a fundamental period in both the recording and feed directions, i.e., that part of the raster structure extending in the direction involved lying between two raster repetitions, but which does not in itself contain a repetition, each scanning line of the picture being divided into a plurality of partial lines extending in the recording direction, said recording means comprising an independently operable recording device for each partial line, said raster signal producing means comprising an electronic store for each scanning line falling in a fundamental period in the feed direction, each store having a respective section for each partial line of the scanning line involved, each section of a store having stored raster signals contained therein phase shifted by an amount $\lambda$ with respect to the corresponding section of the store for the following scanning line, with $\lambda = 360°/N$, where $N$ equals the number of scanning lines in a fundamental period, and the phase shift between store sections for successive partial lines amounts to $\lambda/n$, wherein $n$ equals the number of partial lines in a scanning line, means responsive to rotation of said first and second second drum means for selectively controlling the operative connection of the respective stores to the signal-receiving means in correspondence on the scanning line being scanned, of a fundamental period, operative to connect each section of a selected store with a corresponding one of said means, and means arranged to receive said raster signals and said scanned picture signals for operatively effecting a superimposition of such signals, whereby the output of such means, supplied to said recording means, is operative to control the recording action thereof.

12. An apparatus according to claim 11, wherein said recording elements each comprise a recording lamp, and means for operatively focusing the output of each recording element on corresponding partial lines of the scanning line involved.

13. An apparatus according to claim 12, wherein said focusing means comprises an optical fiber bundle for each recording lamp, lens means for focusing the output of each lamp on the adjacent end of the corresponding fiber bundle, the opposite ends of such bundles being disposed adjacent one another and lens means common to such adjacent ends for focusing light therefrom on the recording media.

14. An apparatus according to claim 11 wherein said superimposing means comprises a respective superimposing and threshold value stage for each of said recording means.

15. An apparatus according to claim 14, wherein said means for selectively controlling the operation of said store comprises a generator driven in synchronism with said first and second drum means, an output register associated with each store for controlling the selective operative connection of each section of the associated store to said superimposing means, a sequence switch operatively connected to the respective registers for controlling the operation of the respective output registers, and control means connected to said generator and said sequence switch operative to control operation of the latter in dependence upon predetermined rotation of said drum means.

16. An apparatus according to claim 15 wherein said stores are constructed to store the desired information in digital form, comprising in further combination, a digital analog decoder interposed between said registers and said superimposing means.

17. An apparatus for producing rastered color separations for the colored reproduction of a picture original, by dot-by-dot and line-by-line recording of picture signals derived from such picture original, with rasters rotated with respect to the recording direction, comprising first rotatable drum means for supporting a picture original with the picture content thereof non-obliquely oriented relative to the direction of the drum axis, scanning means arranged to scan such a picture original supported on said first drum means along substantially circumferentially extending scanning lines, means for producing respective raster signals for each separation, corresponding to raster angles of rotation having a rational tangent, and which respectively represent congruent raster areas having the width of a plurality of dots of the picture original, and having boundary lines lying in the recording and feed directions defining a fundamental period of the rotated rasters allocated to the respective color separations, i.e., that part of the raster structure in each direction involved which does not in itself contain a repetition, said raster-producing means being constructed to divide such raster areas into partial lines of finer resolution than the width of the scanned picture lines with the raster signals for each rotated raster corresponding to the structure of each partial line, means superimposing the picture signals on the respective raster signals, second rotatable drum means for supporting recording media upon which color separations are to be recorded, means for rotating said first and second drum means in synchronism, and recording means arranged for cooperation with said second drum means for effecting a recording, along substantially circumferential lines, corresponding to the original scanning lines, of the superimposed signals and in correspondence to the direction of the partial lines, on recording media supported on said second drum means, with the recorded picture content having a like non-oblique orientation relative to the direction of said second drum axis, whereby each of such recordations represents a color separation having a recorded raster structure, corresponding to the associated rotated raster, extending angularly with respect to said substantially circumferential recording lines.

18. An apparatus according to claim 17, wherein each scanning line of the picture is divided into a plurality of partial lines extending transversely to the picture recording direction, said recording means comprising a cathode ray tube, means supplying a deflection signal to said tube to periodically deflect the electron beam thereof transversely across a picture line, rapidly in comparison with the picture recording speed, said raster signal producing means comprising means for generating a sawtooth voltage of relatively high frequency and means for generating a sawtooth voltage of relatively low frequency, cooperable when superimposed to be representative of the desired rotated raster pattern, means for operatively superimposing said sawtooth voltages, the output of said last-mentioned means being operatively connected to said superimposing means receiving the scanned picture signals, for superimposition of the latter on the raster signals, the output of the last-mentioned means being connected to said cathode ray tube for varying the brightness of the light beam thereof in accordance with said superimposed raster and scanned picture signals.

19. An apparatus according to claim 18, wherein each of said sawtooth voltage generating means includes a voltage generator operative to provide a plurality of sawtooth output voltages, phase shifted with respect to one another, a selector switch for each generator means for selectively connecting desired output voltages thereof to the means for superimposing the respective sawtooth voltages.

20. An apparatus according to claim 19, wherein each of said sawtooth generator means is provided with a ring counter, operable to control the respective phase shifted outputs of the associated generator means to produce the desired raster rotation relative to said circumferential recording direction.

21. An apparatus according to claim 20, comprising in further combination, a master timing generator the output of which, reduced by respective frequency dividers as required, is operatively connected to said ring counters, said signal selection switches, said means for supplying deflection signals to the cathode ray tube, and to said means for rotating said drum means, for controlling the synchronized operation thereof.

* * * * *